US010072172B2

(12) United States Patent
Kuwahara et al.

(10) Patent No.: US 10,072,172 B2
(45) Date of Patent: Sep. 11, 2018

(54) FLEXIBLE VINYL CHLORIDE RESIN COMPOSITION, MOLDED PRODUCT, ELECTRIC WIRE COATING MATERIAL, AND COATED ELECTRIC WIRE

(71) Applicant: Mitsubishi Rayon Co., Ltd., Chiyoda-ku (JP)

(72) Inventors: Atsushi Kuwahara, Otake (JP); Hiroyuki Nishii, Otake (JP); Shinya Hirai, Otake (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/024,565

(22) PCT Filed: Sep. 12, 2014

(86) PCT No.: PCT/JP2014/074319
§ 371 (c)(1),
(2) Date: Mar. 24, 2016

(87) PCT Pub. No.: WO2015/045930
PCT Pub. Date: Apr. 2, 2015

(65) Prior Publication Data
US 2016/0237297 A1 Aug. 18, 2016

(30) Foreign Application Priority Data
Sep. 25, 2013 (JP) ................. 2013-198487

(51) Int. Cl.
| C09D 127/06 | (2006.01) |
| H01B 3/44 | (2006.01) |
| C08L 27/06 | (2006.01) |
| C08K 5/12 | (2006.01) |
| C08L 33/10 | (2006.01) |

(52) U.S. Cl.
CPC .............. C09D 127/06 (2013.01); C08K 5/12 (2013.01); C08L 27/06 (2013.01); H01B 3/443 (2013.01); H01B 3/447 (2013.01); C08L 33/10 (2013.01); C08L 2203/202 (2013.01)

(58) Field of Classification Search
CPC .......... C08L 27/06; H01B 3/443; H01B 3/447
See application file for complete search history.

(56) References Cited

U.S. PATENT DOCUMENTS

| 3,784,661 A * | 1/1974 | Schaul ................ B29C 49/0005 264/209.3 |
| 5,248,546 A * | 9/1993 | Greenlee ................. B32B 27/30 428/212 |
| 5,658,980 A | 8/1997 | Ichikawa |
| 7,847,012 B2 | 12/2010 | Fujimoto et al. |
| 2007/0282027 A1 | 12/2007 | Fujimoto et al. |
| 2016/0247597 A1* | 8/2016 | Kuwahara ............. H01B 3/443 |

FOREIGN PATENT DOCUMENTS

| EP | 0 711 806 A2 | 5/1996 |
| EP | 0 711 806 A3 | 5/1996 |
| EP | 2 206 743 A1 | 7/2010 |
| IN | 201107383 A * | 12/2012 |
| JP | 02-218732 A | 8/1990 |
| JP | 05-311021 A | 11/1993 |
| JP | 08-188691 A | 7/1996 |
| JP | 10-338764 A | 12/1998 |
| JP | 2001-234014 A | 8/2001 |
| JP | 2002-179868 A | 6/2002 |
| JP | 2002-194126 A | 7/2002 |
| JP | 2006-36844 A | 2/2006 |
| TW | 200813141 | 3/2008 |
| WO | 2010/119842 A1 | 10/2010 |

OTHER PUBLICATIONS

International Search Report dated Dec. 2, 2014 for PCT/JP2014/074319 filed on Sep. 12, 2014.
Extended European Search Report dated Aug. 29, 2016 in Patent Application No. 14846933.1.

* cited by examiner

Primary Examiner — Vickey M Nerangis
(74) Attorney, Agent, or Firm — Oblon, McClelland, Maier & Neustadt, L.L.P.

(57) ABSTRACT

The invention provides a flexible vinyl chloride resin composition, a molded product obtained from the resin composition, an electric wire coating material, and an electric wire coated by the electric wire coating material. In the flexible vinyl chloride resin composition, based on 100 parts by mass of (A), the content of (B) is 0.1 parts by mass to 20 parts by mass and the content of (C) is 10 parts by mass to 150 parts by mass. A molded product having excellent surface smoothness and excellent flexibility can be obtained via the flexible vinyl chloride resin composition even under the condition of high production speed.

(A) vinyl chloride resin;
(B) powdered processing aid containing an alkyl methacrylate copolymer obtained by polymerizing 10 mass % to 100 mass % of alkyl methacrylate for which the alkyl group of an alkyl ester portion contains a $C_3$ to $C_5$ straight-chain or branched alkyl group, 0 mass % to 90 mass % of methyl methacrylate, and 0 mass % to 20 mass % of other copolymerizable monomers;
(C) plasticizer.

14 Claims, No Drawings

FLEXIBLE VINYL CHLORIDE RESIN COMPOSITION, MOLDED PRODUCT, ELECTRIC WIRE COATING MATERIAL, AND COATED ELECTRIC WIRE

BACKGROUND OF THE INVENTION

Field of the Invention

The invention relates to a flexible vinyl chloride resin composition. More specifically, the invention relates to a flexible vinyl chloride resin composition of a molded product having excellent surface smoothness and excellent flexibility even under the condition of high production speed, a molded product thereof, an electric wire coating material, and a coated electric wire.

Description of Related Art

The vinyl chloride resin has excellent chemical/physical properties such as chemical resistance, weather resistance, flame retardance, and electrical insulation, and is inexpensive, and therefore is extensively applied as a common resin material having high usability. Since the flexible vinyl chloride composition has excellent properties, or flexibility . . . etc. can be readily provided via the addition of a plasticizer, the flexible vinyl chloride composition is applied in many areas in, for instance, coated electric wires, sheet materials, in particular flooring materials, tapes, and films for agriculture in particular.

Moreover, the vinyl chloride resin is inexpensive, and therefore currently production for the object of further increasing productivity at higher production speed while keeping the product cost down is underway.

However, during the molding process under the condition of high production speed, the retention and kneading time of the resin inside the molding machine is very short, and therefore melting and kneading readily become insufficient. Moreover, since the allowable molding conditions of the vinyl chloride resin are limited, a satisfactory molded product cannot be readily obtained by only changing the mold processing conditions.

In particular, the production speed of flexible molding containing a plasticizer is greater compared to hard molding without a plasticizer, and a new method capable of improving kneading state is desired to meet the demand of greater production speed.

In general, to improve the kneading state of the vinyl chloride resin, various methods in which an acrylic resin having a high molecular weight is added for the objects of facilitating melting and providing melt viscosity have been proposed.

For instance, patent literature 1 to patent literature 3 disclose: by adding an acrylic resin having methyl methacrylate as the main component and used as a processing aid in a vinyl chloride resin coated electric wire, processability and dispersibility can be increased.

Moreover, patent literature 4 discloses: by adding an acrylic resin as a modifier in a flexible vinyl chloride resin, a molded product suitable for a metal coating and having excellent shape conformability can be obtained.

However, a molded product having, for instance, satisfactory smooth surface cannot be obtained under the condition of high production speed. Moreover, since flexibility is degraded by adding a high-glass transition temperature component, current techniques are insufficient.

Based on the above, a flexible vinyl chloride resin composition capable of forming a molded product having excellent surface smoothness and excellent flexibility even under the condition of high production speed is desired.

CURRENT TECHNICAL LITERATURE

Patent Literature

[Patent literature 1] JP H2-218732
[Patent literature 2] JP 2001-234014
[Patent literature 3] JP 2002-179868
[Patent literature 4] JP H8-188691

SUMMARY OF THE INVENTION

Issues to be Solved by the Invention

The object of the invention is to provide a flexible vinyl chloride resin composition, a molded product thereof, an electric wire coating material, and a coated electric wire. The flexible vinyl chloride resin composition can form a molded product having excellent surface smoothness and excellent flexibility even under the condition of high production speed.

Means for Solving Issues

It is discovered in the invention that, the issues mentioned in the invention can be solved by the following vinyl chloride resin composition, and the vinyl chloride resin composition is formed by adding a powdered processing aid containing a specific alkyl methacrylate copolymer and a plasticizer in specific amounts in a vinyl chloride resin.

Accordingly, the invention is related to the following [1] to [10].

[1] A flexible vinyl chloride resin composition, wherein based on 100 parts by mass of (A), the content of (B) is 0.1 parts by mass to 20 parts by mass and the content of (C) is 10 parts by mass to 150 parts by mass, (A) vinyl chloride resin;

(B) powdered processing aid for a flexible vinyl chloride resin, containing an alkyl methacrylate copolymer obtained by polymerizing 10 mass % to 100 mass % of alkyl methacrylate for which the alkyl group of an alkyl ester portion contains a $C_3$ to $C_5$ branched alkyl group, 0 mass % to 90 mass % of methyl methacrylate, and 0 mass % to 20 mass % of other copolymerizable monomers;

(C) plasticizer.

[2] The flexible vinyl chloride resin composition of [1], wherein based on 100 parts by mass of the (A) vinyl chloride resin, the content of the (B) processing aid for a flexible vinyl chloride resin is 0.5 parts by mass to 20 parts by mass.

[3] The flexible vinyl chloride resin composition of [1] or [2], wherein the $C_3$ to $C_5$ branched alkyl group is a $C_4$ branched alkyl group.

[4] The flexible vinyl chloride resin composition of any one of [1] to [3], wherein the alkyl methacrylate for which the alkyl group of the alkyl ester portion contains a $C_3$ to $C_5$ branched alkyl group is isobutyl methacrylate.

[5] The flexible vinyl chloride resin composition of any one of [1] to [4], wherein the plasticizer (C) is selected from at least one of a phthalic acid compound, a trimellitic acid compound, a phosphoric acid compound, an adipic acid compound, a citric acid compound, an ether compound, a polyester compound, and a soybean oil compound.

[6] The flexible vinyl chloride resin composition of any one of [1] to [5], wherein the vinyl chloride resin (A) is selected from at least one of a vinyl chloride polymer having an average chlorine content of 56 mass % to 75 mass % and a vinyl chloride copolymer formed by copolymerizing the vinyl chloride polymer and an elastomer, and/or an elastic material.

[7] A molded product formed by the flexible vinyl chloride resin composition of any one of [1] to [6].

[8] The molded product of [7], wherein the surface hardness thereof is 75 or less (durometer D hardness).

[9] The molded product of [7] or [8], wherein the molded product is an electric wire coating material.

[10] An electric wire coated by the electric wire coating material of [9].

Effects of the Invention

By using the flexible vinyl chloride resin composition of the invention, a flexible vinyl chloride resin molded product capable of forming a molded product such as an electric wire coating material having excellent surface smoothness can be produced in a stable manner even under the condition of high production speed.

DESCRIPTION OF THE EMBODIMENTS

In the following, the invention is described in detail.

<Vinyl Chloride Resin (A)>

The type of the vinyl chloride resin of the vinyl chloride resin (A) used in the invention is not particularly limited, and examples can include, for instance: a homopolymer of vinyl chloride, a chlorinated vinyl chloride polymer, a partially crosslinked vinyl chloride polymer, or a copolymer of other vinyl compounds capable of copolymerizing with vinyl chloride in a range of 30 mass % or less copolymerized with vinyl chloride, and a mixture thereof.

The other vinyl compounds capable of copolymerizing with vinyl chloride are not particularly limited, and specific examples can include, for instance: fatty acid vinyl ester such as vinyl acetate or vinyl propionate; alkyl methacrylate such as methyl methacrylate or ethyl methacrylate; alkyl acrylate such as ethyl acrylate or butyl acrylate; α-olefin such as ethylene, propylene, or styrene; alkyl vinyl ether such as vinyl methyl ether or vinyl butyl ether; unsaturated carboxylic acid or anhydride thereof such as acrylic acid, methacrylic acid, or maleic anhydride. The compounds can be used alone or in a combination of two or more. If the copolymer amount of the other copolymerizable vinyl compounds is 30 mass % or less, then the original characteristics of the vinyl chloride resin are not compromised, which is preferred.

The vinyl chloride resin is preferably selected from at least one resin of a vinyl chloride polymer having an average chlorine content of 56 mass % to 75 mass % and a vinyl chloride copolymer formed by copolymerizing a vinyl chloride polymer and an elastomer, and/or an elastic substance. Moreover, the vinyl chloride resins can be used alone or in a combination of two or more.

Moreover, the average degree of polymerization of the vinyl chloride resin (A) used in the invention is preferably in the range of 300 to 5,000, more preferably 500 to 3,000. By setting the average degree of polymerization to 300 or more, the mechanical properties of the molded product are good. Moreover, by setting the average degree of polymerization to 5,000 or less, the processability is good.

The production method of the vinyl chloride resin (A) used in the invention is not particularly limited, and a vinyl chloride resin produced from various polymerization methods such as an emulsion polymerization method, a suspension polymerization method, or a bulk polymerization method can be used.

<Processing Aid (B)>

The processing aid (B) of the invention is a powdered processing aid containing an alkyl methacrylate copolymer (hereinafter polymer (β)), and the polymer (β) is obtained by polymerizing 10 mass % to 100 mass % of an alkyl methacrylate (b-1) (hereinafter monomer (b-1)) for which the alkyl group of the alkyl ester portion contains a $C_3$ to $C_5$ branched alkyl group, 0 mass % to 90 mass % of methyl methacrylate (b-2) (hereinafter monomer (b-2)), and 0 mass % to 20 mass % of other copolymerizable monomers (b-3) (hereinafter monomer (b-3)).

The alkyl group of the alkyl ester portion of the monomer (b-1) used in the invention contains a $C_3$ to $C_5$ branched alkyl group. If the branched alkyl group is $C_3$ or more, then the large-volume property of the molecular chains is sufficient, and as a result the dispersibility of the processing aid (B) is good, and the appearance of the molded product is improved. Moreover, since the large-volume property is sufficient, the expansion effect between vinyl chloride resin molecular chains is sufficient, and flexibility can be provided to the molded product. Moreover, by setting the carbon number of the branched alkyl group to 5 or less, reduction of glass transition temperature of the processing aid (B) can be inhibited, and therefore powder recyclability is increased. In particular, the branched alkyl group is preferably $C_4$. By setting the carbon number to 4, balance between the improving effect of the dispersibility and the flexibility of the processing aid (B) and the powder recyclability is good.

Since the alkyl group of the alkyl ester portion of the monomer (b-1) has branched chains, large-volume property is effectively provided to molecular chains, the interactive effect between molecular chains is weakened, and the dispersibility of the processing aid (B) is increased during molding as a result. Therefore, the melting (gelation) of the vinyl chloride resin during molding is accelerated. Moreover, the degree of kneading is also uniformly increased, and the appearance of the molded product is improved.

Moreover, high large-volume property of molecular chains is provided to the processing aid (B) by branched chains, and when added to the flexible vinyl chloride resin, the processing aid (B) enters into the gaps between vinyl chloride resin molecular chains generated by the plasticizer. As a result, the distance between the vinyl chloride resin molecular chains can be further increased, the plasticizing efficiency is increased, and flexibility is achieved.

The monomer (b-1) can include, for instance: isopropyl methacrylate, isobutyl methacrylate, isoamyl methyl methacrylate, tert-butyl methacrylate, tert-amyl methacrylate, sec-butyl methacrylate, neopentyl methacrylate. In particular, in terms of good appearance improving capability and powder recyclability of the molded product, isobutyl methacrylate, tert-butyl methacrylate, and sec-butyl methacrylate for which the carbon number of the branched alkyl group is 4 are preferred, and isobutyl methacrylate having superior thermal stability is more preferred.

The alkyl methacrylates can be used alone or in a combination of two or more as needed.

Methyl methacrylate is used as the monomer (b-2). By using methyl methacrylate, high gloss can be provided to the molded product.

Other copolymerizable monomers (b-3) can also be used.

The monomers (b-3) are not particularly limited as long as they can be copolymerized with the monomer (b-1), and can include, for instance: acrylate such as ethyl acrylate, butyl acrylate, 2-ethylhexyl acrylate, benzyl acrylate, or phenyl acrylate; alkyl methacrylate other than (b-1) such as ethyl methacrylate, hexyl methacrylate, octyl methacrylate, or 2-ethylhexyl methacrylate; aromatic methacrylate such as benzyl methacrylate or phenyl methacrylate; an aromatic vinyl compound such as styrene, α-methylstyrene, or vinyltoluene; a vinyl cyanide compound such as acrylonitrile or methacrylonitrile; vinyl ester such as vinyl acetate; anhydride such as maleic anhydride. The monomers can be used alone or in a combination of two or more.

Based on 100 mass % of all of the monomers of the raw material of the polymer β, the usage amount of the monomer (b-1) is 10 mass % to 100 mass %, preferably 30 mass % to 100 mass %, more preferably 40 mass % to 100 mass %, still more preferably 50 mass % to 100 mass %, still yet more preferably 60 mass % to 100 mass %, still yet more preferably 65 mass % to 100 mass %, and most preferably 80 mass % to 100 mass %. By setting the usage amount of the monomer (b-1) to 10 mass % or more, the large-volume property of the molecular chains is sufficient. As a result, the appearance of the molded product can be improved, and flexibility can further be provided to the molded product.

Based on 100 mass % of all of the monomers of the raw material of the polymer (β), the usage amount of the monomer (b-2) is 0 mass % to 90 mass %, preferably 0 mass % to 70 mass %, more preferably 0 mass % to 60 mass %, still more preferably 0 mass % to 50 mass %, still yet more preferably 0 mass % to 40 mass %, still yet more preferably 0 mass % to 35 mass %, and most preferably 0 mass % to 20 mass %. By setting the usage amount of the monomer (b-2) to 90 mass % or less, melting and kneading of the flexible vinyl chloride resin composition can be effectively performed, and appearance improving effect of the molded product can be achieved.

Based on 100 mass % of all of the monomers of the raw material of the polymer (β), the usage amount of the monomers (b-3) is 0 mass % to 20 mass %, preferably 0 mass % to 10 mass %.

By setting the ratio of the monomers (b-3) to 20 mass % or less, melting and kneading of the target flexible vinyl chloride resin composition of the invention can be effectively performed without affecting the object of good appearance of the molded product.

A polyfunctional monomer such as divinyl benzene, allyl methacrylate, 1,3-butanediol dimethacrylate, or triallyl cyanurate can also be used as the monomers (b-3), and based on 100 mass % of all of the monomers of the raw material of the polymer (β), the usage amount of the monomers is preferably 0.1 mass % to 2 mass %, more preferably 0.2 mass % to 1 mass %. If the usage amount of the polyfunctional monomer is 2 mass % or less, then the object of good molding appearance of the processing aid (B) of the invention is not compromised, which is preferred.

Various methods can be used to produce the polymer (β), and can include a polymerization method such as emulsion polymerization, suspension polymerization, or solution polymerization. Moreover, any method such as adding all at once, dropwise addition, or adding in batches can be used for the monomer, and a method such as random copolymerization or block copolymerization can also be used, and a random copolymer obtained by a method of adding the monomer all at once is preferred.

When emulsion polymerization is applied, the usable emulsifier is not particularly limited, and various emulsifiers can be used, such as: an anionic surfactant such as fatty acid salt, alkyl sulfate, alkyl benzene sulfonate, alkyl phosphate, or dialkyl sulfosuccinate; a nonionic surfactant such as polyoxyethylene alkyl ether, polyoxyethylene fatty acid ethyl ester, sorbitan fatty acid ester, or glycerol fatty acid esters. Moreover, a cationic surfactant such as alkyl ammonium salt can also be used. Moreover, the emulsifiers can be used alone or in combination.

Moreover, when the pH value of the polymerization system becomes alkaline due to the type of the emulsifier, a suitable pH regulator can also be used to prevent hydrolysis of alkyl methacrylate. The pH regulator can include, for instance: boric acid-potassium chloride-potassium hydroxide, potassium dihydrogen phosphate-disodium hydrogen phosphate, boric acid-potassium chloride-potassium carbonate, citric acid-potassium hydrogen citrate, potassium dihydrogen phosphate-borax, or disodium hydrogen phosphate-citric acid.

Moreover, the polymerization initiator can also be aqueous or oil-soluble, and independent or redox. For instance, a common inorganic initiator such as persulfate can also be used alone, or be used in combination with sulfite, bisulfite, or thiosulfate as a redox initiator. Accordingly, an organic peroxide or an azo compound such as tert-butyl hydroperoxide, cumene hydroperoxide, benzoyl peroxide, or lauroyl peroxide can also be used alone, or used in combination with sodium formaldehyde sulfonate as a redox initiator, but the invention is not limited to the specific examples.

The method of recycling the polymer (β) in powder form is not particularly limited. For instance, in the case that an emulsion polymerization method is used to perform production, the resulting alkyl methacrylate polymer latex can be cooled, and then after the polymer is precipitated by performing acid coagulation or salting via an electrolyte such as an acid such as sulfuric acid, hydrochloric acid, or phosphoric acid or a salt such as aluminum chloride, calcium chloride, magnesium sulfate, aluminum sulfate, or calcium acetate, filtering, washing, and drying are performed. Good powder recyclability in the invention means that powder recycling is readily performed since the polymer (β) does not become coarse powder or very-fine powder under normal powdering conditions.

Moreover, recycling can also be performed by various methods such as spray drying and freeze drying to achieve good molding appearance of the flexible vinyl chloride resin composition, wherein spray drying is preferred.

Spray drying refers to drying performed by blowing hot air to the latex of the polymer after spraying the latex of the polymer in fine droplets in a spray drying apparatus.

The method of spraying the latex of the polymer in fine droplets in the spray drying apparatus can include, for instance, a rotating disk, a pressure nozzle, a dual fluid nozzle, or a pressurized dual fluid nozzle.

The capacity of the spray drying apparatus can be any of the small capacity used in laboratories to the large capacity used in industries.

The structure of the supply portion of the heating gas for drying in the spray drying apparatus and the structure of the discharge portion of the heating gas for drying and the dry powder can be suitably selected as needed.

The temperature of the heating gas for drying is preferably 200° C. or less, more preferably 120° C. to 180° C.

The molecular weight of the polymer (β) is not particularly limited, and the reduced viscosity ηsp/c thereof is preferably set to 0.2 to 15, more preferably 0.3 to 14. By setting ηsp/c to 0.2 or more, gelling promoting capability and the improving capability of the degree of kneading are further improved, and when set to 15 or less, the load to the motor of the molding machine can be reduced.

Moreover, the reduced viscosity ηsp/c in the invention refers to the value measured by dissolving 0.1 g of a (co)polymer in 100 mL of chloroform at 25° C. The method of adjusting the reduced viscosity ηsp/c can include: common methods such as adjusting the usage amount of the chain-transfer agent and the initiator during polymerization and adjusting the polymerization temperature.

The chain-transfer agent can include, for instance: alkyl mercaptan such as n-octyl mercaptan or tert-dodecyl mercaptan.

The amount of the chain-transfer agent is not particularly limited, and based on 100 parts by mass of all of the monomers of the polymer (β), is preferably 0 parts by mass to 2 parts by mass, more preferably 0 parts by mass to 1 part by mass, still more preferably 0 parts by mass to 0.5 parts by mass.

Moreover, in addition to the polymer (β), the processing aid (B) of the invention can also contain an additive as needed. The additive can include a powder flowability modifier such as inorganic salt or Aerosil.

<Plasticizer (C)>

The plasticizer (C) is a compound that, when added to a vinyl chloride resin, hinders the strong interactive effect between the vinyl chloride polymer molecular chains and increases the distance between the vinyl chloride polymer molecular chains, so as to provide flexibility to the vinyl chloride resin via the effects.

The plasticizer (C) used in the invention is not particularly limited, and is preferably selected from at least one of a phthalic acid compound, a trimellitic acid compound, a phosphoric acid compound, an adipic acid compound, a citric acid compound, an ether compound, a polyester compound, and a soybean oil compound, and can include, for instance: phthalic acid dialkyl such as dioctyl phthalate, diisononyl phthalate, or diisodecyl phthalate; alkyl benzyl phthalate such as butyl benzyl phthalate; alkyl aryl phthalate; dibenzyl phthalate; diaryl phthalate; trialkyl trimellitate such as tris(2-ethylhexyl) trimellitate; triaryl phosphate such as tricresyl phosphate; trialkyl phosphate; alkyl aryl phosphate; adipate; citrate such as acetyl tributyl citrate; an ether compound such as polypropylene glycol; a polyester compound; a soybean oil compound such as epoxidized soybean oil.

The compounds can be used alone, and can also be used in a combination of two or more.

The flexible vinyl chloride resin composition of the invention contains the vinyl chloride resin (A), the processing aid (B), and the plasticizer (C). At this point, the flexibility improving effect of the processing aid (B) is achieved by including both the processing aid (B) and the plasticizer (C).

The plasticizer (C) is formed by a high-polarity portion capable of interacting with the vinyl chloride resin and a low-polarity portion having a large size, and an electrostatic interaction occurs between the high-polarity portion and the vinyl chloride resin, such that the interactive effect between vinyl chloride polymer molecular chains is hindered. Moreover, the large-size portion of the plasticizer (C) enters between the vinyl chloride polymer molecular chains at the same time, and therefore the distance between the vinyl chloride polymer molecular chains can be increased. Therefore, the interactive effect between the vinyl chloride polymer molecular chains is weakened, and mobility is increased as a result, such that flexibility is achieved.

Moreover, since the polymer (β) in the processing aid (B) contains alkyl methacrylate for which the alkyl group contains a $C_3$ to $C_5$ branched alkyl group, the polymer (β) has a large-size structure, but does not have a portion capable of hindering the degree of the interactive effect between the vinyl chloride polymer molecular chains, and therefore the polymer (β) monomer does not have the capability to enter between the molecular chains.

However, if the plasticizer (C) is used, then the plasticizer (C) enters between the vinyl chloride polymer molecular chains and hinders the interactive effect between the vinyl chloride polymer molecular chains. Therefore, the low-polarity portion of the plasticizer (C) and the polymer (β) have hydrophobic interactive effect, and thus the polymer (β) can enter between the vinyl chloride polymer molecular chains.

Therefore, the large-volume property of the polymer (β) further increases the distance between the vinyl chloride polymer molecular chains, and as a result the mobility of the vinyl chloride polymer is increased, and the flexibility of the vinyl chloride resin is increased. That is, the plasticizing efficiency is increased by including both the processing aid (B) and the plasticizer (C).

Based on 100 parts by mass of the vinyl chloride resin (A), the content of the processing aid (B) in the vinyl chloride resin composition of the invention is 0.1 parts by mass to 20 parts by mass, preferably 0.5 parts by mass to 20 parts by mass, and more preferably 0.5 parts by mass to 15 parts by mass. By setting the addition amount of the processing aid (B) to 0.1 parts by mass or more, the gelation properties are sufficient and a molding appearance improving effect can be achieved as a result. Moreover, a plasticizing efficiency improving effect can be achieved. Moreover, by using 20 parts by mass or less, significant increase in melt viscosity inside the molding machine can be prevented, and good molding appearance is obtained. Moreover, overload to the motor of the processing machine can be prevented.

Based on 100 parts by mass of the vinyl chloride resin (A), the content of the plasticizer (C) is 10 parts by mass to 150 parts by mass, preferably 30 parts by mass to 150 parts by mass.

By setting the addition amount of the plasticizer to 10 parts by mass or more, the hindering effect of the interactive effect of the vinyl chloride resin molecular chains is sufficient, and the distance between the vinyl chloride resin molecular chains is sufficiently increased, such that flexibility is achieved. Moreover, by hindering the strong interactive effect between the vinyl chloride resin molecular chains, the processing aid (B) enters between the vinyl chloride resin molecular chains, such that the plasticizing efficiency improving capability of the processing aid (B) can be achieved.

Moreover, by setting the addition amount of the plasticizer to 150 parts by mass or less, reduction in mechanical properties, flame retardance, and electrical properties can be prevented.

In the vinyl chloride resin composition of the invention, as long as the effects of the invention are not compromised, various additives such as a common stabilizer, filler material, flame retardant, lubricant, or impact resistance modifier can be added as needed.

The stabilizer can include, for instance: a lead stabilizer such as tribasic lead sulfate, dibasic lead phosphite, basic lead sulphate, or lead silicate; a metal soap stabilizer derived from a metal such as potassium, magnesium, barium, zinc, cadmium, or lead and fatty acid such as 2-ethylhexanoate, lauric acid, myristic acid, palmitic acid, stearic acid, isostearic acid, hydroxy stearic acid, oleic acid, ricinoleic acid, linolenic acid, or behenic acid; an organic tin stabilizer having an alkyl group, an ester group, a fatty acid group, a maleic acid group or sulfide-containing group; a composite metal soap stabilizer such as Ba—Zn, Ca—Zn, Ba—Ca—Sn, Ca—Mg—Sn, Ca—Zn—Sn, Pb—Sn, or Pb—Ba—Ca; a metal salt stabilizer generally derived from two or more of a metal group such as barium or zinc and branched fatty acid such as 2-ethylhexanoate, isodecyl acid, or trialkyl acetic acid, unsaturated fatty acid such as oleic acid, ricinoleic acid, or linolenic acid; alicyclic acid such as naphthenic acid, organic acid such as aromatic acid such as carbolic acid, benzoic acid, salicylic acid, derivatives thereof; a metal stabilizer such as a metal salt liquid stabilizer formed by dissolving the stabilizers in an organic solvent such as petroleum hydrocarbon, alcohol, or glycerol derivative, and then adding a stabilizing aid such as phosphite, an epoxy compound, an anti-coloring agent, a transparency-improvement agent, a light stabilizer, an antioxidant, an anti-seep agent, or a lubricant. Moreover, a non-metal stabilizer such as an epoxy compound such as an epoxy resin or an epoxidized fatty acid alkyl ester, or an organic phosphite can also be included. The stabilizers can be used alone or in a combination of two or more.

The addition amount of the stabilizer is not particularly limited, and based on 100 parts by mass of the vinyl chloride resin (A), is preferably 1 part by mass to 15 parts by mass, more preferably 1 part by mass to 8 parts by mass. By using 1 part by mass or more, thermal decomposition during processing can be suppressed, and by using 15 parts by mass or less, reduction in the mechanical properties of the molded product can be prevented.

Moreover, the filler material can include: carbonate such as talc, heavy calcium carbonate, precipitated calcium carbonate, or colloidal calcium carbonate; an inorganic filler material such as aluminum hydroxide, magnesium hydroxide, titanium oxide, clay, mica, wollastonite, zeolite, silicon dioxide, zinc oxide, magnesium oxide, carbon black, graphite, glass bead, glass fiber, carbon fiber, or metal fiber. Moreover, organic fiber such as polyamide can also be used. The filler materials can be used alone or in a combination of two or more.

The addition amount of the filler material is not particularly limited, and based on 100 parts by mass of the vinyl chloride resin (A), is preferably 1 part by mass to 150 parts by mass, more preferably 10 parts by mass to 100 parts by mass. By using 1 part by mass or more, suitable rigidity can be provided to the molded product, and by using 150 parts by mass or less, reduction in the flexibility of the molded product can be prevented.

Moreover, the flame retardant can include, for instance: metal hydroxide, a bromine compound, a compound containing triazine, a zinc compound, a phosphorous compound, a halogen flame retardant, a silicon flame retardant, an intumescent flame retardant, or antimony oxide. The flame retardants can be used alone or in a combination of two or more.

The addition amount of the flame retardant is not particularly limited, and based on 100 parts by mass of the vinyl chloride resin (A), is preferably 1 part by mass to 150 parts by mass, more preferably 10 parts by mass to 100 parts by mass. By using 1 part by mass or more, the flame retardance of the molded product can be increased, and by using 150 parts by mass or less, reduction in the flexibility of the molded product can be prevented.

Moreover, the lubricant can include, for instance: a pure hydrocarbon lubricant such as liquid paraffin, natural paraffin, micro wax, synthetic paraffin, or low molecular weight-polyethylene, a fatty acid lubricant such as a halogenated hydrocarbon lubricant, higher fatty acid, or oxy fatty acid, a fatty acid amide lubricant such as fatty acid amide or di-fatty acid amide, polyol ester of fatty acid such as lower alcohol ester of fatty acid or glyceride, an ester lubricant such as polyglycol ester of fatty acid or fatty alcohol ester (ester wax) of fatty acid. Moreover, metal soap, fatty alcohol, polyol, polyglycol, polyglycerol, partial ester of fatty acid and polyol, partial ester of fatty acid and polyglycol, or partial ester of fatty acid and polyglycerol can also be used. The lubricants can be used alone or in a combination of two or more.

The addition amount of the lubricant is not particularly limited, and based on 100 parts by mass of the vinyl chloride resin (A), is preferably 0.1 parts by mass to 15 parts by mass, more preferably 0.1 parts by mass to 5 parts by mass. By using 0.1 parts by mass or more, adhesion of the resin composition to the molding machine can be reduced, and by using 15 parts by mass or less, reduction in processability can be prevented.

Accordingly, when the impact resistance modifier is used, examples thereof can include, for instance: acrylic core-shell rubber such as chlorinated polyethylene, polybutadiene, polyisoprene, polychloroprene, fluororubber, styrene-butadiene copolymer rubber, acrylonitrile-styrene-butadiene copolymer rubber, methyl methacrylate-styrene-butadiene copolymer rubber, or acrylate-methacrylate copolymer, silicone-core-shell rubber such as silicone-acrylate-methacrylate copolymer or silicone-acrylate-acrylonitrile-styrene copolymer, styrene-butadiene-styrene block copolymer rubber, styrene-isoprene-styrene block copolymer rubber, styrene-ethylene-butylene-styrene block copolymer rubber, ethylene-propylene copolymer rubber, or ethylene-propylene-diene copolymer rubber (EPDM). The diene of EPDM can include: 1,4-hexadiene, dicyclopentadiene, methylene norbornene, ethylidene norbornene, or vinyinorbornene. The impact resistance modifiers can be used alone or in a combination of two or more.

The addition amount of the impact resistance modifier is not particularly limited, and based on 100 parts by mass of the vinyl chloride resin (A), is preferably 1 part by mass to 20 parts by mass, more preferably 1 part by mass to 15 parts by mass. By using 1 part by mass or more, the impact strength of the molded product can be increased, and by using 20 parts by mass or less, reduction in molding appearance can be prevented.

Moreover, as long as the effects of the invention are not compromised, a mold-release agent, a flowability improver, a colorant, an anti-static agent, a surfactant, an anti-fogging agent, an antibacterial agent, and a foaming agent can also be arbitrarily used as needed.

The method of obtaining the flexible vinyl chloride resin composition of the invention is not particularly limited, and a common method can be used. For instance, the following methods can be used to obtain the flexible vinyl chloride resin composition of the invention: a Henschel mixer, a Banbury mixer, a V-type mixer, and a belt blender. Specific amounts of the vinyl chloride resin (A), the processing aid (B), and the plasticizer (C) are mixed.

In addition to using a kneading extruder such as a single-screw extruder or a biaxial extruder for the extrusion and the molding of the resulting flexible vinyl chloride resin composition, a common molding method such as injection molding, blow molding, or roll processing can also be used to obtain various desired molded products.

The surface hardness (durometer D hardness) of the molded product obtained by molding the flexible vinyl chloride resin composition of the invention is preferably 75 or less, more preferably 70 or less.

A durometer D hardness of 75 or less is suitable for a flexible molded product.

The surface hardness can be arbitrarily adjusted via a common method such as the addition amount of the plasticizer, the type of the plasticizer, the degree of polymerization of the vinyl chloride resin, and the addition amount of the filler material as long as the effects of the invention are not compromised.

The flexible vinyl chloride resin composition of the invention can also be preferably used as an electric wire coating material. Good appearance can be achieved for the electric wire coating material even under high line-speed production conditions (high production speed conditions). The high line-speed production conditions refer to, for instance, extruding and coating a thin electric wire having a diameter of about 1 to 5 mmφ at 1000 m/min or more, and extruding and coating a thick electric wire having a diameter of about 50 mmφ at 15 m/min to 30 m/min. The shear rate at this point sometimes reaches, for instance, 5000/s to 15000/s.

In the case that the flexible vinyl chloride resin composition of the invention is used as the electric wire coating material, the flexible vinyl chloride resin composition can be directly coated on a conductor, and can also be coated on a common insulated electric wire as a sheath material. The condition of producing the coated electric wire using the resin composition is not particularly limited, and a general method can be used to perform the production.

For instance, the production can be performed via, for instance, the following method: kneading the vinyl chloride resin composition using a roller, a Banbury mixer, or an extruder, and then a known extruder for electric wire provided with a cross-head die is used to coat the electric wire and extrude and mold . . . etc. the resulting particle mixture and conductor.

EXAMPLES

In the following, the invention is specifically described via examples. However, the invention is not limited to the examples.

Moreover, "parts" in each example and comparative example represents "parts by mass". Evaluation is performed via the following methods.

(1) Evaluation of Appearance

The vinyl chloride resin composition of the invention was provided to a 25 mm single-screw extruder (made by Thermo Plastics, 130° C.-145° C.-160° C.-160° C. (C1-C2-C3-D), screw speed: 80 rpm) and extrusion and granulation were performed.

The resulting particles were filled in a capillary rheometer (made by Malvern, barrel: φ15 mm, 160° C., mold: φ 1.0 mm*16 mm), and extrusion was performed at a shear rate of 10000/s. The resulting strand surface was observed and the number of irregularities on the surface was counted at every 5 cm of the molded product with the naked eye.

(2) Surface Hardness

An 8-in. roller was used to melt and knead the particles extruded from the 25 mm single-screw extruder at 160 t for 3 minutes to obtain a vinyl chloride resin composition sheet material having a thickness of about 1 mm. 8 pieces of the resulting vinyl chloride resin composition sheet material having a thickness of about 1 mm were stacked, and hot press was performed at 160° C. and 5 MPa for 3 minutes to obtain a molded product of an 8 mm-thick plate.

The surface hardness of the resulting molded product was measured after 4 seconds of retention using an A-type durometer (made by ASKER, "Digital rubber durometer DD2-A type") based on Japanese Industrial Standards (JIS) K7215. In the case that the measured value of the A-type durometer exceeds 90, measurement was performed similarly using a D-type durometer (made by Ueshima-Seisakusho, "HD-104N type"). A lower average value represents better flexibility.

(3) Tensile Modulus of Elasticity

A JIS2 dumbbell was formed from the 1 mm thick plate obtained in (2) based on JIS K6723, and then a tensile test was performed at 200 mm/min and measurement was performed. A lower tensile modulus of elasticity represents better flexibility.

EXAMPLES AND COMPARATIVE EXAMPLES

Except for various processing aids in specific amounts, various plasticizers in specific amounts, 100 parts of a vinyl chloride resin (TK-1300, made by Shin-Etsu Chemicals, average degree of polymerization: 1300, average chlorine content: 57 mass %), 4 parts of a Ca—Zn composite stabilizer as the stabilizer (RUP-103, made by ADEKA), 40 parts of calcium carbonate as the filler material (Whiton SSB Blue, made by Shiraishi Calcium Kaisha, Ltd.), 30 parts of aluminum hydroxide used as the flame retardant (Hidilite H-31, made by Showa Denko K.K.), and 0.5 parts of Montanoate used as the lubricant (OP-Wax, made by Hoechst) were provided to a Henschel mixer and uniformly mixed to obtain a vinyl chloride resin composition.

The following are used for the processing aid.

[Production Example 1] Production of Processing Aid (B-1)

180 parts of ion-exchanged water was added in a reaction vessel provided with a mixer and a reflux condenser, and then 0.1 parts of anhydrous sodium carbonate, 98 parts of isobutyl methacrylate, 2 parts of n-butyl acrylate, and 1.0 part of n-octyl mercaptan were added thereto. Then, substitution was performed inside the vessel with nitrogen. In particular, 1.1 parts of sodium lauryl sulfate was added, and the reaction vessel was heated to 45° C. while stirring. After 0.15 parts of potassium persulfate was added to begin the polymerization reaction, heating and stirring were performed for 2 hours to end the polymerization. After the resulting latex was cooled, spray drying was performed under the conditions of an inlet temperature of 150° C. and an outlet temperature of 65° C. to obtain the processing aid (B-1).

[Production Example 2 to Production Example 9] Production of Processing Aid (B-2 to B-9)

The compositions of the monomer components and the addition amount of the n-octyl mercaptan were changed as recited in Table 1. Moreover, the production of each processing aid was performed similarly to production example 1.

The following processing aids are used for B-10 to B-14.

(B-10) acrylic processing aid P530 (made by Mitsubishi Rayon, methyl methacrylate high-molecular weight polymer/without (b-1) component)

(B-11) acrylic processing aid P531 (made by Mitsubishi Rayon, methyl methacrylate high-molecular weight polymer/without (b-1) component)

(B-12) acrylic processing aid P551 (made by Mitsubishi Rayon, methyl methacrylate high-molecular weight polymer/without (b-1) component)

(B-13) acrylic processing aid PA40 (made by Kaneka, methyl methacrylate-butyl acrylate copolymer)

(B-14) acrylic processing aid K125 (made by Dow, methyl methacrylate-ethyl acrylate-n-butyl methacrylate-ethyl methacrylate copolymer/n-butyl methacrylate content less than 10 mass %)

TABLE 1

|  |  |  | Production example 1 | Production example 2 | Production example 3 | Production example 4 | Production example 5 | Production example 6 |
|---|---|---|---|---|---|---|---|---|
| Monomer component (parts by mass) | (b-1) | i-BMA | 98 | 98 | 98 | 98 | 70 | 50 |
|  | (b-2) | MMA | — | — | — | — | 28 | 48 |
|  | (b-3) | n-BA | 2 | 2 | 2 | 2 | 2 | 2 |
|  |  | n-BMA | — | — | — | — | — | — |
| Chain-transfer agent |  | n-OM | 1 | 0.5 | 0.15 | 0 | 0 | 0 |
| Rate of polymerization [%] |  |  | 99 | 99 | 99 | 99 | 99 | 99 |
| Reduced viscosity ηsp/c |  |  | 0.5 | 2 | 9 | 12 | 12 | 12 |
| Processing aid (B) |  |  | (B-1) | (B-2) | (B-3) | (B-4) | (B-5) | (B-6) |

|  |  |  | Production example 7 | Production example 8 | Production example 9 |
|---|---|---|---|---|---|
| Monomer component (parts by mass) | (b-1) | i-BMA | — | — | — |
|  | (b-2) | MMA | 96 | 48 | 68 |
|  | (b-3) | n-BA | 4 | 2 | 2 |
|  |  | n-BMA | — | 50 | 30 |
| Chain-transfer agent |  | n-OM | 0.25 | 4 | 0.25 |
| Rate of polymerization [%] |  |  | 99 | 99 | 99 |
| Reduced viscosity ηsp/c |  |  | 7 | 1 | 7 |
| Processing aid (B) |  |  | (B-7) | (B-8) | (B-9) |

The abbreviations in the table are as below.

i-BMA: isobutyl methacrylate

MMA: methyl methacrylate n-BA: n-butyl acrylate n-BMA: n-butyl methacrylate n-OM: n-octyl mercaptan Here, the rate of polymerization is calculated by quantitating the residual monomer content of the polymerized latex solution via a gas chromatograph.

The following can be used for the plasticizer.

Diisononyl phthalate (DINP, made by J-Plus)

Tris(2-ethylhexyl)trimellitate (TOTM, Monocizer W-705, made by DIC)

Tricresyl phosphate (TCP, made by Daihachi Chemical Industry, Co.)

Acetyl tributyl citrate (ATBC, Monocizer ATBC, made by DIC)

Epoxidized soybean oil (ESBO, EMBILIZER NF-3200, made by Tokyo Seika Co.)

Polyester plasticizer (W230S, Polycizer W-230-S, made by DIC)

TABLE 2

|  |  | Example 1 | Example 2 | Example 3 | Example 4 | Example 5 | Example 6 |
|---|---|---|---|---|---|---|---|
| Vinyl chloride resin (A) [parts] |  | 100 | 100 | 100 | 100 | 100 | 100 |
| Plasticizer (C) [parts] | DINP | 50 | 50 | 50 | 50 | 50 | 50 |
|  | TOTM | — | — | — | — | — | — |
|  | TCP | — | — | — | — | — | — |
|  | ATBC | — | — | — | — | — | — |
|  | ESBO | — | — | — | — | — | — |
|  | W230S | — | — | — | — | — | — |
| Processing aid (B) | [Parts] | 5 | 5 | 5 | 5 | 5 | 5 |
|  | Type | (B-1) | (B-2) | (B-3) | (B-4) | (B-5) | (B-6) |
| (B) Reduced viscosity ηsp/c |  | 0.5 | 2 | 9 | 12 | 12 | 12 |
| (b-1) content [mass %] |  | 98 | 98 | 98 | 98 | 70 | 50 |
| Number of surface irregularities [#/5 cm] |  | 0 | 0 | 0 | 0 | 1 | 6 |
| Surface hardness |  |  |  |  |  |  |  |
| Duometer A hardness |  | 82.0 | 80.7 | 81.7 | 80.4 | 81.0 | 81.6 |
| Durometer D hardness |  | <70 | <70 | <70 | <70 | <70 | <70 |
| Tensile modulus of elasticity [MPa] |  | 71.0 | 54.5 | 62.0 | 51.0 | 74.6 | 70.0 |

|  |  | Comparative example 1 | Comparative example 2 | Comparative example 3 | Comparative example 4 | Comparative example 5 | Comparative example 6 | Comparative example 7 | Comparative example 8 | Comparative example 9 |
|---|---|---|---|---|---|---|---|---|---|---|
| Vinyl chloride resin (A) [parts] |  | 100 | 100 | 100 | 100 | 100 | 100 | 100 | 100 | 100 |
| Plasticizer (C) [parts] | DINP | 50 | 50 | 50 | 50 | 50 | 50 | 50 | 50 | 50 |
|  | TOTM | — | — | — | — | — | — | — | — | — |
|  | TCP | — | — | — | — | — | — | — | — | — |
|  | ATBC | — | — | — | — | — | — | — | — | — |
|  | ESBO | — | — | — | — | — | — | — | — | — |
|  | W230S | — | — | — | — | — | — | — | — | — |

TABLE 2-continued

| | | | | | | | | | |
|---|---|---|---|---|---|---|---|---|---|
| Processing aid (B) [parts] | — | 5 | 5 | 5 | 5 | 5 | 5 | 5 | 5 |
| Type | — | (B-7) | (B-8) | (B-9) | (B-10) | (B-11) | (B-12) | (B-13) | (B-14) |
| (B) Reduced viscosity ηsp/c | — | 7 | 1 | 7 | 10 | 12 | 4 | 9 | 5 |
| (b-1) content [mass %] | — | 0 | 0 (straight-chain 50) | 0 (straight-chain 30) | 0 | 0 | 0 | 0 | 0 (straight-chain 8) |
| Number of surface irregularities [#/5 cm] | 58 | 41 | 38 | 12 | 35 | 42 | 43 | 53 | 54 |
| Surface hardness | | | | | | | | | |
| Durometer A hardness | 85.4 | 88.1 | 87.1 | 86.7 | 87.1 | 86.9 | 87.0 | 86.6 | 87.0 |
| Durometer D hardness | <70 | <70 | <70 | <70 | <70 | <70 | <70 | <70 | <70 |
| Tensile modulus of elasticity [MPa] | 82.2 | 125.3 | 94.4 | 99.4 | 90.4 | 93.8 | 106.6 | 99.0 | 104.8 |

Example 1 to Example 6

It can be known from the results of Table 2 that, in comparison to the case without the processing aid (comparative example 1) and the case in which the processing aid is added in an amount outside the range of the invention (comparative example 2 to comparative example 9), in example 1 to example 6 containing the (b-1) component in the range of the invention, kneading and dispersion are both good, and the molding appearance is significantly improved. The reason can be determined to be the specific amount of (b-1) component used.

Moreover, in comparison to the case without the processing aid (comparative example 1), in example 1 to example 6 containing the (b-1) component in the range of the invention, the surface hardness and the tensile modulus of elasticity are both significantly reduced. The reason is that: the large-size property of the molecules of the processing aid (B) are sufficient, and the processing aid (B) and the plasticizer enter between the vinyl chloride polymer molecular chains together, such that the distance between the vinyl chloride resin molecular chains is sufficiently increased, and the plasticizing efficiency is increased.

Comparative Example 2 to Comparative Example 9

In comparative example 2 to comparative example 9 in which the processing aid (B-7) to the processing aid (B-14) without the (b-1) component are used, an appearance improving effect is not observed. The reason can be determined to be: sufficient kneading is not performed in the case of the processing aids. Moreover, in comparison to example 1 to example 6 containing the (b-1) component and the case without the processing aid (comparative example 1), in comparative example 2 to comparative example 9 without the (b-1) component, flexibility is lost and plasticizing efficiency is reduced. The reason can be determined to be: the large-size property of the molecules of the processing aid are insufficient, and even when entering between the vinyl chloride molecular chains with the plasticizer, the distance between the vinyl chloride resin molecular chains still cannot be increased (i.e., does not increase plasticizing efficiency). Moreover, it can be determined that, the processing aid has a greater glass transition temperature than the vinyl chloride resin, and therefore having the processing aid results in less flexibility than without the processing aid (comparative example 1).

It can be known from the above results that, surface appearance improving capability and plasticizing efficiency improving capability are significantly different based on whether alkyl methacrylate for which the alkyl group contains a $C_3$ to $C_5$ branched alkyl group is used.

TABLE 3

| | | Example 7 | Example 8 | Comparative example 10 | Comparative example 11 | Example 9 | Comparative example 12 | Comparative example 13 |
|---|---|---|---|---|---|---|---|---|
| Vinyl chloride resin (A) [parts] | | 100 | 100 | 100 | 100 | 100 | 100 | 100 |
| Plasticizer (C) [parts] | DINP | 50 | 50 | 50 | 50 | 70 | 70 | 70 |
| | TOTM | — | — | — | — | — | — | — |
| | TCP | — | — | — | — | — | — | — |
| | ATBC | — | — | — | — | — | — | — |
| | ESBO | — | — | — | — | — | — | — |
| | W230S | — | — | — | — | — | — | — |
| Processing aid (B) | [parts] | 0.3 | 1 | 0.3 | 1 | 5 | — | 5 |
| | Type | (B-1) | (B-1) | (B-12) | (B-12) | (B-1) | — | (B-12) |

TABLE 3-continued

|  |  |  |  |  |  |  |  |
|---|---|---|---|---|---|---|---|
| (B) Reduced viscosity ηsp/c | 0.5 | 0.5 | 4 | 4 | 0.5 | — | 4 |
| (b-1) content [mass %] | 98 | 98 | 0 | 0 | 98 | — | 0 |
| Number of surface irregularities [#/5 cm] | 40 | 19 | 54 | 49 | 0 | 2 | 2 |
| Surface hardness |  |  |  |  |  |  |  |
| Durometer A hardness | 85.2 | 84.7 | 85.6 | 85.9 | 62.3 | 69.3 | 75.0 |
| Durometer D hardness | <70 | <70 | <70 | <70 | <70 | <70 | <70 |
| Tensile modulus of elasticity [MPa] | 82.0 | 80.4 | 84.7 | 87.9 | 14.3 | 18.0 | 18.7 |

|  | Example 10 | Comparative example 14 | Comparative example 15 | Example 11 | Comparative example 16 | Comparative example 17 |
|---|---|---|---|---|---|---|
| Vinyl chloride resin (A) [parts] | 100 | 100 | 100 | 100 | 100 | 100 |
| Plasticizer (C) [parts] DINP | 20 | 20 | 20 | — | — | — |
| TOTM | — | — | — | 50 | 50 | 50 |
| TCP | — | — | — | — | — | — |
| ATBC | — | — | — | — | — | — |
| ESBO | — | — | — | — | — | — |
| W230S | — | — | — | — | — | — |
| Processing aid (B) [parts] | 5 | — | 5 | 5 | — | 5 |
| Type | (B-1) | — | (B-12) | (B-1) | — | (B-12) |
| (B) Reduced viscosity ηsp/c | 0.5 | — | 4 | 0.5 | — | 4 |
| (b-1) content [mass %] | 98 | — | 0 | 98 | — | 0 |
| Number of surface irregularities [#/5 cm] | 20 | 61 | 50 | 2 | 51 | 41 |
| Surface hardness |  |  |  |  |  |  |
| Durometer A hardness | >90 | >90 | >90 | >90 | >90 | >90 |
| Durometer D hardness | 65.0 | 69.7 | 72.3 | 46.3 | 48.0 | 49.3 |
| Tensile modulus of elasticity [MPa] | 2052 | 2360 | 2428 | 164.0 | 170.0 | 194.0 |

|  | Example 12 | Comparative example 18 | Comparative example 19 | Example 13 | Comparative example 20 | Comparative example 21 |
|---|---|---|---|---|---|---|
| Vinyl chloride resin (A) [parts] | 100 | 100 | 100 | 100 | 100 | 100 |
| Plasticizer (C) [parts] DINP | — | — | — | — | — | — |
| TOTM | — | — | — | — | — | — |
| TCP | 50 | 50 | 50 | — | — | — |
| AMC | — | — | — | 50 | 50 | 50 |
| ESBO | — | — | — | — | — | — |
| W230S | — | — | — | — | — | — |
| Processing aid (B) [parts] | 5 | — | 5 | 5 | — | 5 |
| Type | (B-1) | — | (B-12) | (B-1) | — | (B-12) |
| (B) Reduced viscosity ηsp/c | 0.5 | — | 4 | 0.5 | — | 4 |
| (b-1) content [mass %] | 98 | — | 0 | 98 | — | 0 |
| Number of surface irregularities [#/5 cm] | 2 | 31 | 30 | 0 | 12 | 10 |
| Surface hardness |  |  |  |  |  |  |
| Durometer A hardness | 84.7 | 86.0 | 89.3 | 70.3 | 74.0 | 77.3 |
| Durometer D hardness | <70 | <70 | <70 | <70 | <70 | <70 |
| Tensile modulus of elasticity [MPa] | 94.7 | 101.3 | 114.3 | 31.0 | 34.0 | 36.0 |

|  | Example 14 | Comparative example 22 | Comparative example 23 | Example 15 | Comparative example 24 | Comparative example 25 |
|---|---|---|---|---|---|---|
| Vinyl chloride resin (A) [parts] | 100 | 100 | 100 | 100 | 100 | 100 |
| Plasticizer (C) [parts] DINP | — | — | — | — | — | — |
| TOTM | — | — | — | — | — | — |
| TCP | — | — | — | — | — | — |
| AMC | — | — | — | — | — | — |
| ESBO | 50 | 50 | 50 | — | — | — |
| W230S | — | — | — | 50 | 50 | 50 |
| Processing aid (B) [parts] | 5 | — | 5 | 5 | — | 5 |
| Type | (B-1) | — | (B-12) | (B-1) | — | (B-12) |

TABLE 3-continued

| | | | | | | |
|---|---|---|---|---|---|---|
| (B) Reduced viscosity ηsp/c | 0.5 | — | 4 | 0.5 | — | 4 |
| (b-1) content [mass %] | 98 | — | 0 | 98 | — | 0 |
| Number of surface irregularities [#/5 cm] | 3 | 35 | 25 | 0 | 34 | 26 |
| Surface hardness | | | | | | |
| Durometer A hardness | 77.7 | 84.7 | 89.3 | 74.3 | 81.0 | 86.3 |
| Durometer D hardness | <70 | <70 | <70 | <70 | <70 | <70 |
| Tensile modulus of | 64.0 | 72.3 | 87.0 | 34.3 | 41.0 | 43.7 |

Example 7 and Example 8

Based on the results of Table 3, in comparison to the case of no processing aid (comparative example 1) and the case in which the processing aid is used in an amount outside the range of the patent application (comparative example 10 and comparative example 11), in example 7 and example 8 in which the (b-1) component is used in an amount in the range of the patent application, even if the amount is low, the molding appearance is also improved and the plasticizing efficiency is also increased. The reason can be determined to be: by using a specific amount of the (b-1) component, kneading and dispersion are good, and the distance between the vinyl chloride resin molecular chains can be sufficiently increased.

Example 9 and Example 10

Based on the results of Table 3, regardless of the amount of the plasticizer in example 9 and example 10 containing the (b-1) component in an amount in the range of the patent application, in comparison to the case without the processing aid (comparative example 12 and comparative example 14) and the case in which the processing aid is added in an amount outside the range of the patent application (comparative example 13 and comparative example 15), the molding appearance is improved and the plasticizing efficiency is also increased. The reason can be determined to be: by using a specific amount of the (b-1) component, kneading and dispersion are good, and the distance between the vinyl chloride resin molecular chains can be sufficiently increased.

Example 11 to Example 15

Based on the results of Table 3, regardless of the type of the plasticizer in example 11 to example 15 containing the (b-1) component in an amount in the range of the patent application, in comparison to the case without the processing aid (comparative example 16, comparative example 18, comparative example 20, comparative example 22, and comparative example 24) and the case in which the processing aid is added in an amount outside the range of the patent application (comparative example 17, comparative example 19, comparative example 21, comparative example 23, and comparative example 25), the molding appearance is improved and the plasticizing efficiency is also increased. The reason can be determined to be: by using a specific amount of the (b-1) component, kneading and dispersion are good, and the distance between the vinyl chloride resin molecular chains can be sufficiently increased.

It can be known from the above results that, regardless of the amount of the plasticizer and the type of the plasticizer, surface appearance improving ability and plasticizing efficiency improving ability are significantly different based on whether alkyl methacrylate for which the alkyl group contains a $C_3$ to $C_5$ branched alkyl group is used.

What is claimed is:

1. A flexible vinyl chloride resin composition, comprising:
    (A) a vinyl chloride resin;
    (B) a powdered processing aid for a flexible vinyl chloride resin, comprising an alkyl methacrylate copolymer obtained by polymerizing of from 10 mass % to 100 mass % of alkyl methacrylate for which an alkyl group of an alkyl ester portion contains a $C_3$ to $C_5$ branched alkyl group, from 0 mass % to 90 mass % of methyl methacrylate, and from 0 mass % to 20 mass % of other copolymerizable monomers; and
    (C) a plasticizer,
    wherein, based on 100 parts by mass of the (A), a content of the (B) is from 0.1 parts by mass to 20 parts by mass and a content of the (C) is from 25 parts by mass to 150 parts by mass.

2. The flexible vinyl chloride resin composition of claim 1, wherein, based on 100 parts by mass of the (A) vinyl chloride resin, a content of the (B) is from 0.5 parts by mass to 20 parts by mass.

3. The flexible vinyl chloride resin composition of claim 1, wherein the $C_3$ to $C_5$ branched alkyl group is a $C_4$ branched alkyl group.

4. The flexible vinyl chloride resin composition of claim 1, wherein the alkyl methacrylate for which the alkyl group of the alkyl ester portion contains the $C_3$ to $C_5$ branched alkyl group is isobutyl methacrylate.

5. The flexible vinyl chloride resin composition of claim 1, wherein the plasticizer (C) is at least one selected from the group consisting of a phthalic acid compound, a trimellitic acid compound, a phosphoric acid compound, an adipic acid compound, a citric acid compound, an ether compound, a polyester compound, and a soybean oil compound.

6. The flexible vinyl chloride resin composition of claim 1, wherein the vinyl chloride resin (A) is at least one selected from the group consisting of a vinyl chloride polymer having an average chlorine atom content of from 56 mass % to 75 mass % and a vinyl chloride copolymer formed by copolymerizing the vinyl chloride polymer and an elastomer, and/or an elastic material.

7. The flexible vinyl chloride resin composition of claim 1, which provides increased surface smoothness, as compared to surface smoothness of a composition which does not comprise 0.1 to 20 parts by mass of the (B) processing aid, to a mold when it is molded under a condition of high production speed,
    wherein the condition of high production speed is extruding and coating a thin electric wire having a diameter of about 1 to 5 mmϕ at 1000 m/min or more, or extruding and coating a thick electric wire having a diameter of about 50 mmϕ at 15 m/min to 30 m/min.

8. The flexible vinyl chloride resin composition of claim 1, which provides increased surface smoothness, as compared to surface smoothness of a composition which does not comprise 0.1 to 20 parts by mass of the (B) processing aid, to a mold when it is molded under a condition of high production speed,
   wherein the high production speed is such that shear rate of the composition ranges from 5000 to 15000/s.

9. The flexible vinyl chloride resin composition of claim 1, wherein the content of the (C) plasticizer is from 30 parts by mass to 150 parts by mass.

10. The flexible vinyl chloride resin composition of claim 1, wherein the content of the (C) plasticizer is from 50 parts by mass to 150 parts by mass.

11. A molded product formed by the flexible vinyl chloride resin composition of claim 1.

12. The molded product of claim 11, wherein a surface hardness, durometer D hardness, of the molded product is 75 or less.

13. The molded product of claim 11, wherein the molded product is an electric wire coating material.

14. An electric wire coated by the electric wire coating material of claim 13.

\* \* \* \* \*